(No Model.) 4 Sheets—Sheet 1.

A. J. ROBINSON.
SAWING MACHINE.

No. 529,839. Patented Nov. 27, 1894.

Attest:
Edward Wyman
Fred W. McArdle

Inventor:
Aaron J. Robinson.
per Edward Summer
atty (No Model.)　　　　　　　　　　　　　　　　　4 Sheets—Sheet 2.
A. J. ROBINSON.
SAWING MACHINE.

No. 529,839.　　　　　　　　　　Patented Nov. 27, 1894.

Attest:
Edward Wyman
Fred W. McArdle

Inventor:
Aaron J. Robinson
per Edw. Dummer, atty.

(No Model.) 4 Sheets—Sheet 3.
A. J. ROBINSON.
SAWING MACHINE.

No. 529,839. Patented Nov. 27, 1894.

(No Model.)  
4 Sheets—Sheet 4.
A. J. ROBINSON.
SAWING MACHINE.
No. 529,839. Patented Nov. 27, 1894.
Fig 4
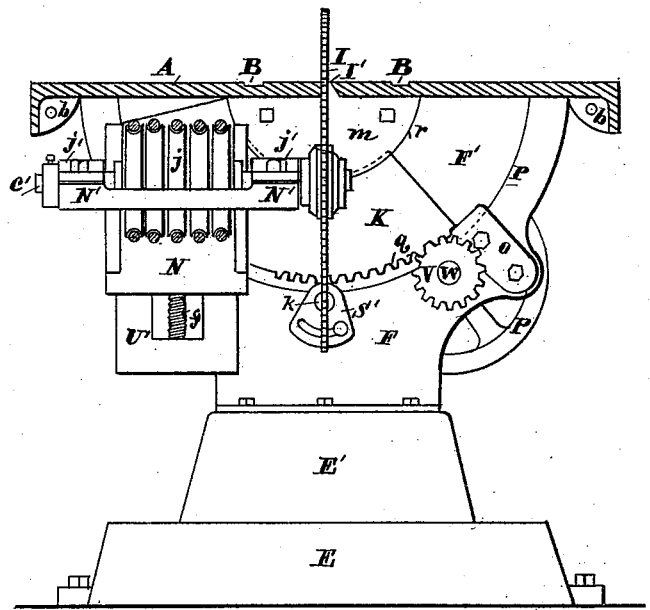
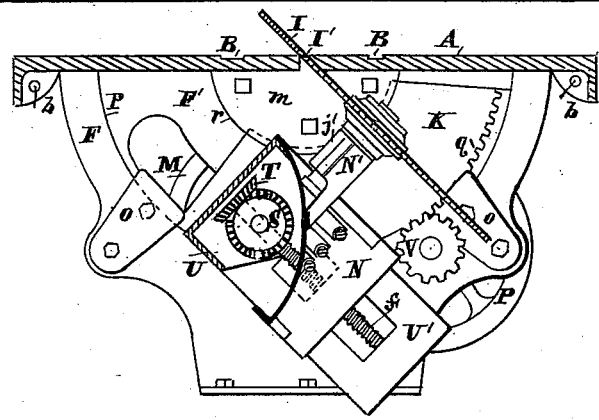
Fig 5
Attest:  
Edward Wyman  
Fred W. H. Crde
Inventor:  
Aaron J. Robinson  
per Edw. Dummer. atty

UNITED STATES PATENT OFFICE.

AARON J. ROBINSON, OF FREMONT, NEW HAMPSHIRE.

SAWING-MACHINE.

SPECIFICATION forming part of Letters Patent No. 529,839, dated November 27, 1894.

Application filed March 20, 1893. Serial No. 466,915. (No model.)

*To all whom it may concern:*

Be it known that I, AARON J. ROBINSON, a resident of Fremont, in the county of Rockingham and State of New Hampshire, have invented a new and useful Improvement in Sawing-Machines, of which the following, taken in connection with the accompanying drawings, is a specification.

My invention relates to sawing machines in which a circular saw is employed and the saw is adjustable as to its angularity with reference to, and its projection above, the table.

The invention consists in the devices and combinations of devices hereinafter set forth and specifically pointed out in the claims.

Figure 1:
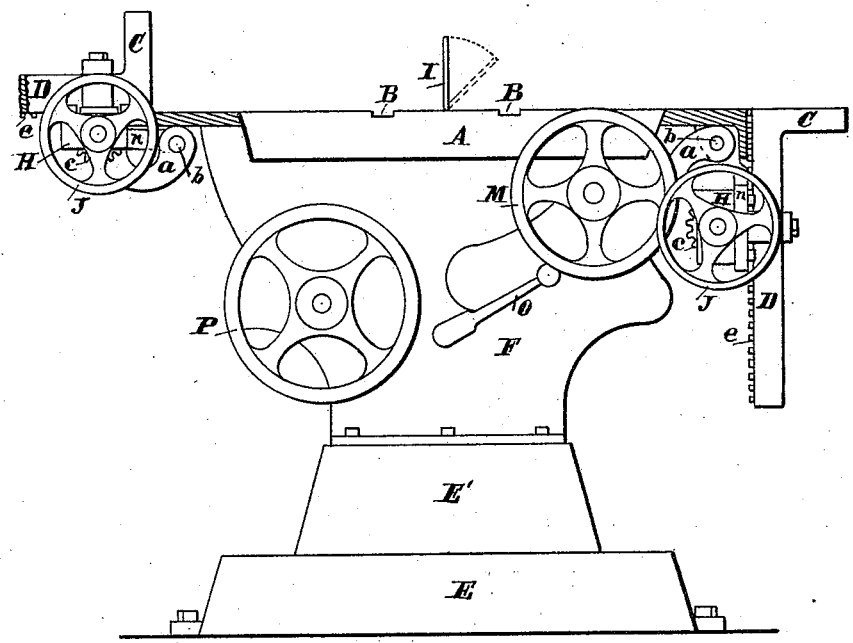
Figure 2:
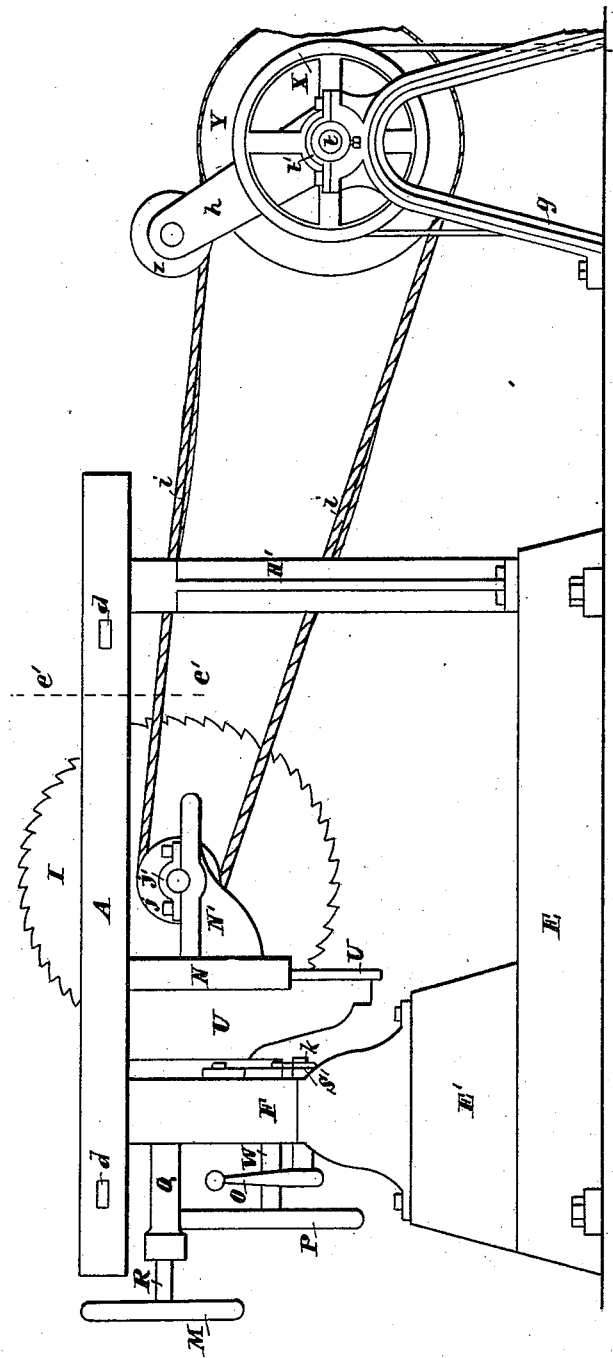
Figure 3:
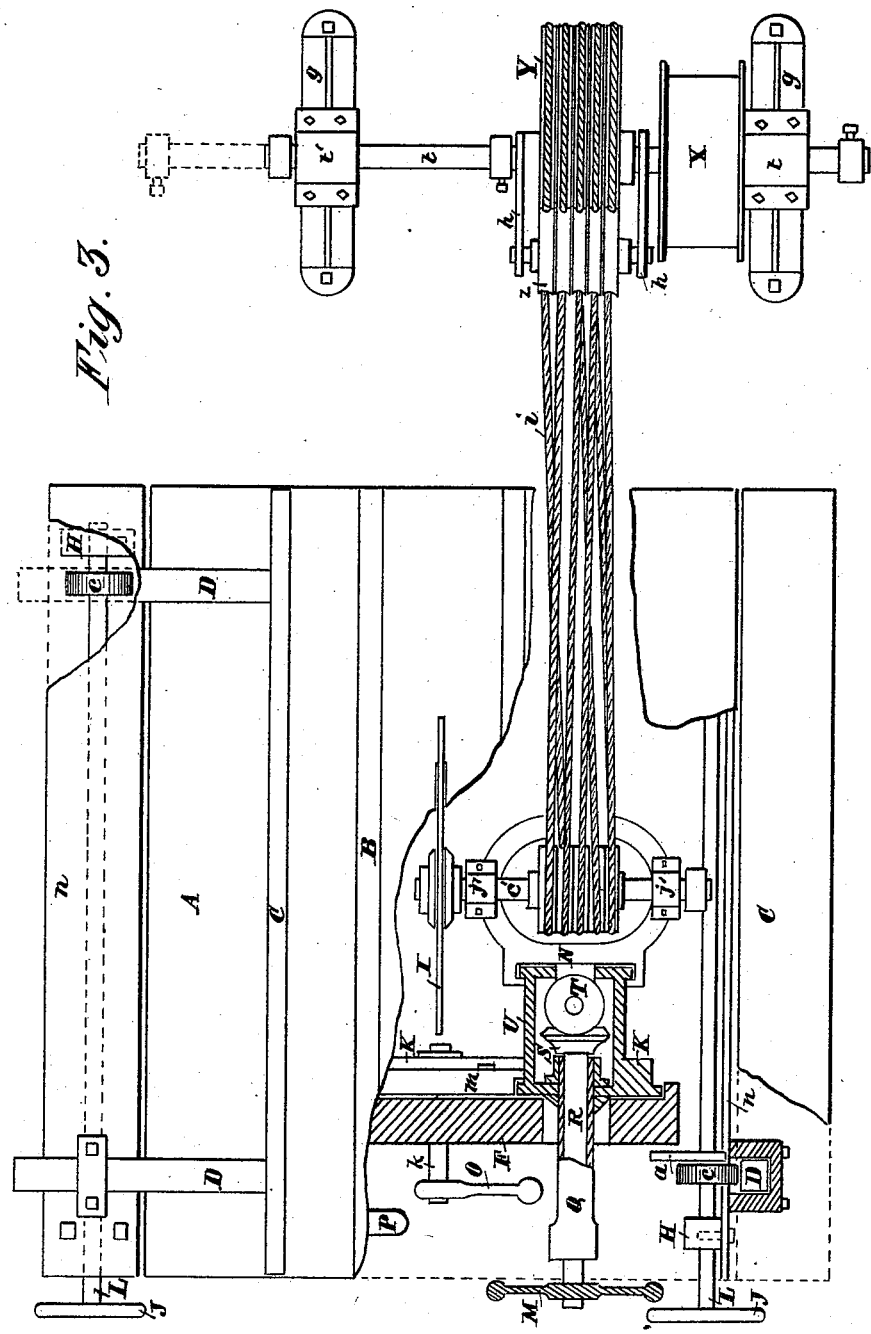

In the drawings—four sheets—Figure 1 is a front and Fig. 2 a side elevation of a sawing machine embodying my invention. Fig. 3 is a plan view, a part being broken away. Fig. 4 showing the saw at right angles with the table, and Fig. 5 showing the saw inclined with reference to the table, are rear views of parts of the machine, the table being shown in section in the direction of line $e'\ e'$, Fig. 2.

The front end of the table A is supported by a piece F, and the rear end by a leg H', the piece F and leg being secured to a base E having a raised portion E'. At the rear side of the support F is a semi-circular groove F', the outer boundary being at P and the inner line at $r$, the center of these lines being at the middle of the slot I' through which the saw I extends, and in the plane of the upper surface of the table. To move in the groove F' is a slide K, held in working position by means of projecting pieces $o$ and $m$. A piece U is secured to the slide K, and in position with reference to this slide as shown, this piece providing ways on the surface U' of which is a block N fitted to slide thereon. On the block N are secured stands N' provided with bearings $j'$, supporting the arbor $c'$ on which is secured the saw I. To revolve in bearings in the piece U is a screw $f$, on which is a nut (not shown) which is fastened to or is a part of the block N. To the screw $f$ is fastened a bevel-gear T, which engages with another bevel-gear S fastened on the inner end of a shaft R. This shaft has bearings in an arm Q which is fastened to the piece U. On the outer end of the shaft R is secured a hand-wheel M which is in a convenient position at the front of the machine. At the front of the machine is another hand-wheel P on a shaft W. This shaft has bearings fixed to the piece F, and has at the inner end a spur-gear V, which engages with a rack $q$ fastened to the slide K. On a shaft $k$, having bearings in the piece F, is fastened, at the outer end, a hand-lever O. The inner end of this shaft is threaded to move in a friction-nut S', this nut being adjustably fastened to the piece F and in position to press against the slide K.

At B B are shown the usual grooves in the table and parallel with the side of the saw for the ordinary slide or carriage. I attach a gage C, on either side of the saw and parallel therewith, to arms D at right angles to the gage. On the under surface of these arms are toothed racks $e$ which engage with spur-gears C on a shaft L, having also fastened thereon a hand-wheel J. Stands H having bearings for the shaft L are fastened to a leaf $n$ pivoted by means of arms or links $a$ to the table at $b$.

For driving the saw I employ a counter shaft $t$ which has bearings $t'$ on suitable stands or hangers $g$. This shaft has thereon a flanged pulley X by which it is driven, and a grooved pulley Y. This pulley Y can move endwise, and, preferably, by being fastened to the shaft which may slide endwise in its bearings.

For driving the saw I employ an endless round belt or rope $i$. This belt or rope is preferably wound around the grooved pulley Y and a grooved pulley $j$ on the saw-arbor as shown and so that the belt or rope will cross itself as it extends from a groove in one pulley to the groove which is adjacent to the opposite or corresponding groove in the other pulley. A binder-pulley $z$ is also, preferably, used, which has a shaft having bearings in arms $h$ pivoted on the shaft $t$.

In operation, the saw may be set at any desired angle with the table by means of the hand-wheel P by which the gear V will be revolved and the slide K moved in the circular groove therefor as required. This slide may then be secured rigidly in place by means of the hand-lever O and nut S'. The saw is shown at right angles to the table in Figs. 1, 2, 3, and 4, and inclined in Fig 5. The saw may then be caused to project above the table the desired distance by manipulation of the hand-wheel M by which and the bevel-gears T and S and screw f the block N carrying the bearings of the saw-arbor is moved on its ways as required. Either of the gages C is then moved toward or away from the saw by means of the hand-wheel J and gears c. If it is not desired to use either of the gages C as such, it may be moved out by means of the hand wheel and gears to the edge of the table, as shown at the left of the machine in Fig. 1, and then swung down on the pivots b so as to form an extension of the table on a plane therewith as shown on the right of the machine in Figs. 1 and 3.

When the gages are removed out to the edge of the table it may be desirable to further support them by means of arms d which may be drawn out, sliding in sockets therefor in the table. Since an endless, round belt or rope i is employed, and the driving pulley Y may move endwise, the driving belt or rope will keep on the pulleys as required whatever position is taken by the saw-arbor by movement of the slide K or block N.

It will be noticed that inclining the saw-arbor with reference to the driving shaft tends to separate one from the other those parts of the belt or rope which cross each other.

I claim as my invention—

1. In combination with the table of a sawing machine, a saw-arbor mounted on a block, a slide providing ways for said block, a curved guide for said slide, a screw having bearings supported by said slide, a nut fixed to said block and to move on said screw, and two bevel gears in engagement with each other, one of which is fastened on said screw and the other on a shaft having bearings fixed to said slide, substantially as and for the purpose set forth.

2. In combination with the table of a sawing machine, a saw-arbor mounted on a block and provided with a pulley having several grooves, a slide providing ways for said block, a curved guide for said slide, a screw having bearings supported by said slide, a nut fixed to said block and to move on said screw, two bevel gears in engagement with each other, one of which is fastened on said screw and the other on a shaft having bearings fixed to said slide, a counter-shaft provided with a pulley having several grooves, bearings for said counter shaft which permit endwise movement of the pulley thereon, and an endless belt or rope extending around said pulleys, substantially as specified.

3. In combination with the table of a sawing machine, a saw-arbor mounted on a block, a slide providing ways for said block, a curved guide for said slide, a screw having bearings supported by said slide, a nut fixed to said block and to move on said screw, two bevel gears in engagement with each other, one of which is fastened on said screw and the other on a shaft having bearings fixed on said slide, a rack fastened to said slide, and a gear to engage with said rack on a shaft having stationary bearings, substantially as specified.

AARON J. ROBINSON.

Witnesses:
CHARLES FLANDERS,
CHARLES YOUNG.